United States Patent Office 3,557,238
Patented Jan. 19, 1971

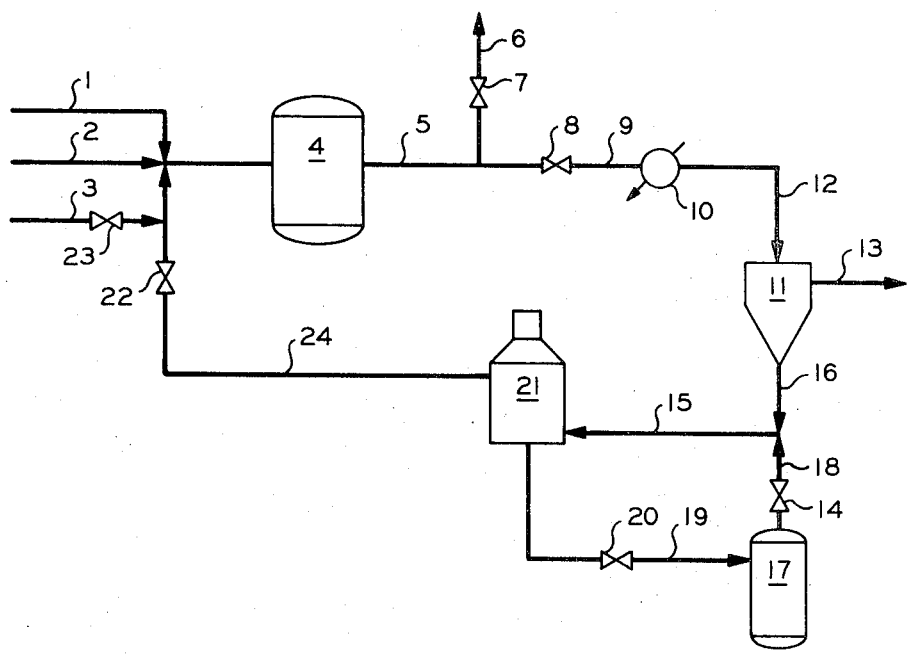

3,557,238
OXIDATIVE DEHYDROGENATION BY-PRODUCT ELIMINATION
Sheldon A. Cunningham, Borger, Tex., assignor to Phillips Petroleum Company, a corporation of Delaware
Filed Nov. 6, 1967, Ser. No. 680,671
Int. Cl. C07c 5/18
U.S. Cl. 260—680     7 Claims

ABSTRACT OF THE DISCLOSURE

Oxygenated hydrocarbons produced in the dehydrogenation of hydrocarbons are recycled to the reactor during the dehydrogenation and/or catalyst regeneration cycles to convert the same to carbon oxides and water.

BACKGROUND OF THE DISCLOSURE

It is conventional in the petroleum industry to catalytically dehydrogenate n-butane over a catalyst such as chromium oxide deposited on an alumina base or carrier to produce an effluent comprising butenes and butadiene. The resulting effluent with or without intermediate separation steps is then subjected to further dehydrogenation in contact with a butene dehydrogenation catalyst to convert the butenes to butadiene, the latter being separated as a product.

A conventional catalyst for butene dehydrogenation comprises iron oxide, chromium oxide, and an alkali metal carbonate such as potassium carbonate. Operation with this catalyst in the presence of relatively large concentrations of steam promotes the water-gas reaction and maintains the catalyst substantially free of carbonaceous deposits as long as there is an effective concentration of the carbonate present in the catalyst. This oxidation reaction also produces small concentrations of oxygenated hydrocarbons which may leave the process in the hydrocarbon effluent and/or in the separated steam condensate.

In a more recently developed butene dehydrogenation process known as oxidative dehydrogenation, an oxygen-containing gas is fed to the catalytic reaction zone containing a catalyst such as stannic phosphate along with the butenes feed and steam, and a substantial portion of the hydrogen produced by dehydrogenation is combusted to water vapor. This not only removes the inhibiting effect of the hydrogen on further dehydrogenation but also supplies heat to this endothermic reaction resulting in high conversions and per-pass yields of butadiene at relatively good selectivity. By this method, additional steam is produced which is recovered from the process effluent as condensate. Also, moderate concentrations of oxygenated hydrocarbons are generated which similarly appear in the condensed steam and/or in the hydrocarbon effluent.

I have found that as much as 4 volume percent of the olefin feed may be converted to oxygenated hydrocarbons such as carboxylic acids, aldehydes, ketones, etc., especially acetic and propionic acids and acetaldehyde; the nature and quantity of these compounds depending on the conditions under which dehydrogenation is effected. Under normal plant operating conditions, these oxygenated by-products will be ultimately vented to the atmosphere and/or discharged with waste water from the process depending upon the separation and recovery processes employed and their operating conditions. However, it has been found that these by-products are toxic and result in damage to property, particularly crops and foliage and are probable contributors to photochemical smog and haze, especially when vented as aerosols. It is not only desirable to eliminate or at least reduce this source of air and water pollution, but such control is essential in any locations. The practice of this invention is helpful in this regard by the accumulation of the oxygenated compounds within the process recycle system during the dehydrogenation period followed by the complete oxidation thereof during the regeneration period. This invention provides further advantage in that the make-up water and/or steam requirement for this process is greatly reduced due to the fact that the water vapor formed by the oxidative dehydrogenation reaction as well as the steam initially fed to the reactor, both contained in the reactor effluent, can be condensed, accumulated, and recycled along with the oxygenated hydrocarbons.

It is, therefore, one object of this invention to provide an improved process for the oxidative dehydrogenation of hydrocarbons. It is another object of this invention to provide a process for the elimination of oxygenated hydrocarbons from dehydrogenation effluents. It is yet another object of this invention to provide an oxidative dehydrogenation process wherein catalyst regeneration steam requirements and oxygenated hydrocarbon emissions are reduced.

DESCRIPTION OF PREFERRED EMBODIMENTS

In accordance with one embodiment of this invention, oxygenated hydrocarbons, produced during hydrocarbon dehydrogenation in the presence of steam, oxygen, and catalyst, are condensed and accumulated along with reactor effluent steam and are recycled through the reactor during the dehydrogenation and/or regeneration cycles.

In the presently preferred embodiment of this invention, a vaporized feed stream containing selected olefin reactants is dehydrogenated in admixture with substantial concentrations of steam and oxygen in contact with a dehydrogenation catalyst known in the art. The olefin feed is preferably comprised primarily of aliphatic olefins having from 4 to about 7 non-quaternary carbon atoms. The invention is applicable to the dehydrogenation of normal butenes and isoamylenes and isoprene, respectively, to butadiene; the conversion of cyclopentene to cyclopentadiene; the conversion of normal amylene to piperylene, and the dehydrogenation of higher olefins, such as hexenes and heptenes, to the corresponding more unsaturated products. The invention is particularly applicable to the dehydrogenation of butene-1 or butene-2, either cis or trans, or mixtures of n-butenes such as crude or purified effluent from a butane dehydrogenation step or process.

The application of the process of this invention to one presently preferred embodiment is represented schematically in the drawing which shows the relationship between the several desired process steps for dehydrogenation effluent condensation and separation and recycle water accumulation and steam generation.

Dehydrogenation catalysts known in the art can be utilized in the dehydrogenation steps, all of these catalysts being known to produce some oxygenated hydrocarbons. However, the problem is generally more pronounced in oxidative dehydrogenation systems with the result that the process of this invention is of relatively higher value when applied to such oxidative dehydrogenation systems. Oxidative dehydrogenation catalysts include the oxides of tin and phosphorus, to which calcium may be added, wherein the calcium to tin ratio lies in the range of 0.1:1 to 5:1; the oxides of tin, boron, and phosphorus in which the boron content is about 1 to 5 weight percent of the composite; lead molybdate in admixture with an aluminum tungstate and/or cobalt tungstate; stannic phosphate; the oxides of iron and chromium, the oxides of molybdenum and bismuth, etc. The catalyst is generally used in pellet form in a fixed bed operation although a powdered form (about 100 mesh size) can be employed in fluidized bed operations.

To illustrate the invention, n-butane is dehydrogenated at a temperature in the range of about 1000–1075° F. and an inlet pressure of about 25 p.s.i.g. in contact with a fixed bed of chromium oxide-on-alumina catalyst at a feed rate of n-butane of about 300,000 standard cubic feet per hour. The effluent from the n-butane dehydrogenation is passed through the process steps of cooling, compression, separation and liquefaction of the $C_4$ and heavier hydrocarbons, and separation of the liquid $C_4$ hydrocarbons into several fractions by a combination of fractional and extractive distillation steps whereby a normal butylene concentrate of about 96 mole percent purity is recovered. The approximate concentrations of the normal butylenes present are about 35, 32, and 29 mole percent, respectively, of 2-butene trans, 1-butene and 2-butene cis, the impurity being predominantly normal butane. About 100,000 standard cubic feet per hour of this vaporized butylene concentrate is so produced which is preheated to about 275° F. About 2,160,000 standard cubic feet per hour of steam is mixed with about 355,000 standard cubic feet per hour of air, the mixture is preheated to 1050° F., and the steam-air stream and the hydrocarbon stream are combined just above the top bed of a vertically cylindrical, down-flow, two-catalyst-bed reactor. This reactant mixture enters the first fixed bed of oxidative dehydrogenation catalyst at an inlet temperature of about 975° F. and a pressure of 10 p.s.i.g. and exits the reactor, after partial quenching, at about 1000° F. and 5 p.s.i.g. If desired, a portion of the steam-air mixture and/or of the hydrocarbon feed may be injected between the two-catalyst beds. About 70 percent of the butylenes are converted to more highly unsaturated product of which about 90 percent or better is to butadiene.

The feed inlet temperature to the butene dehydrogenation step will depend upon the particular catalyst used and the conversion-selectivity relationship desired. Some catalyst effect efficient butene dehydrogenation at a temperature as low as about 800° F. while others require temperatures in the range of 1100 to 1200° F. Desirable regeneration temperatures vary in a similar manner with catalyst type, cycle time, etc., and are usually within the range of 850 to 1100° F. However, it is noted that at the conditions of this example about 4 volume percent of the feed olefin is converted to oxygenated hydrocarbons comprising primarily acetic acid, propionic acid and acetaldehyde. The reactor effluent is cooled and most of the steam is condensed at a temperature of 180° F. and a pressure of 2 p.s.i.g., and the resulting hydrocarbon and water phases are separated with the result that substantially all of the oxygenated hydrocarbons in the reactor effluent are recovered in this steam condensate.

This steam condensate, containing oxygenated hydrocarbons resulting from the dehydrogenation period, is not discharged as liquid or gaseous waste from the process, but is accumulated so that it can be vaporized and heated to produce steam and can be fed through the catalyst with air for catalyst regeneration. Thereby, complete oxidation of these contaminants to carbon oxides and water occurs, thus "cleaning-up" this condensate as regards possible air or water pollution. Thus, process steps of cooling and condensing reactor effluent, of accumulating the liquid portion theerof, and of generating high temperature steam from this condensate are contemplated. The surge vessel for condensate accumulation may be further employed to carry out phase separation of the nitrogen-butadiene-butene gaseous stream from the condensate or the latter may be carried out as a separate step.

The method of process operation during the regeneration period differs from that of the dehydrogenation period in two ways. First, no butene stream is added to the steam-air feed whereby the process step of total condensation of reactor effluent steam (so as to effectively cause separation of the nitrogen-butene-butadiene stream from the water) is not required. Second, condensation of reactor effluent steam and its accumulation are optional. That is, the total reactor effluent may be discharged to the atmosphere since the oxygenated hydrocarbons therein are completely oxidized on passage through the catalyst with air present, or a portion of the steam may be condensed for reasons of water economy, so long as the nitrogen-carbon oxides gas is separated therefrom.

While many modes of operation of this process, wherein high temperature steam is supplied for the dehydrogenation and regeneration periods from the usual plant steam and/or from vaporizing and heating previously accumulated condensate, will be evident to those skilled in this art, one mode of operation is described as follows. Generally, steam from an outside source is supplied at the beginning of the process period until a sufficient volume (inventory) of condensate has been accumulated to meet the total steam requirement for the regeneration period. During this time, the concentration of oxygenated hydrocarbons in the recovered condensate remains essentially constant since process operation may be described as substantially "once through." When a sufficient inventory of condensate has been collected to supply the steam requirement of the regeneration period, condensate is passed to steam generation means and steam is supplied therefrom to the oxidative dehydrogenation reactor at the desired rate whereupon outside steam supply is discontinued. Operation with recycle condensate being supplied as process steam continues for the balance of the dehydrogenation period and as a result, the concentration of oxygenated hydrocarbons therein steadily increases to a final value at the end of the process period. Then, butene feed is discontinued and, after purging the system of hydrocarbons, reactor effluent is then discharged to the atmosphere since the oxygenated hydrocarbons in the condensate are oxidized to carbon oxides and water on the "regeneration pass" through the catalyst and thus the inventory of contaminated condensate is disposed of in a non-polluting manner.

It will be evident to those skilled in this art that recovery of condensate, which has been purified by catalytic oxidation, may be practiced during this regeneration period, if desired, thus further water recovery of and economy is possible. Also, heat may be recovered from the hot reactor effluent as desired.

With reference to the drawing, oxygen (e.g., air), hydrocarbon feed, e.g., butene, and make-up steam are introduced to an oxidative dehydrogenation reactor 4 containing a tin phosphate catalyst by way of conduits 1, 2, and 3, respectively,wherein the several constituents are contacted with the tin phosphate catalyst disclosed in U.S. Pat. No. 3,320,329 at a temperature of 1000° F. and at a total space rate of 4,200 v./v./hr. Steam/air/butene ratios of 21.6/3.5 are employed and the single pass conversion of butene is about 67.6 weight percent of feed. The oxygen in the feed is substantially totally consumed by combination with abstracted hydrogen and by oxidation of a small portion of the feed. Conversion of butene to oxygenated products, primarily organic acids such as acetic acid and aldehydes such as acetaldehyde, is about 4 percent.

Reactor effluent is then passed to condenser 10 via conduits 5 and 9 and open valve 8. Valve 7 is closed, thereby preventing flow via conduit 6 to the atmosphere during the dehydrogenation cycle. The effluent is cooled in condenser 10 to a temperature of 180° F. to condense substantially all of the water present in the effluent. This condensate and a hydrocarbon-nitrogen vapor stream is passed by way of pipe 12 to separator 11 wherein the hydrocarbon and water phases are separated; the water phase being passed to suitable steam generation facilities 21 and storage facilities 17 by way of pipe 16. The separated hydrocarbon-nitrogen gas stream is withdrawn via conduit 13 for further processing.

During the first 26 minutes of the dehydrogenation cycle, fresh steam from an outside source is passed to the process via conduit 3 at a rate of 102,500 pounds per hour (2,160,000 s.c.f.h.), valve 22 in conduit 24 being closed. Air and hydrocarbon are fed to the process via conduits 1 and 2, respectively, at rates of 355,000 s.c.f.h. and 100,000 s.c.f.h. This amount of steam (44,400 pounds in 26 minutes) is increased by about 1440 pounds of water vapor produced by the oxidation of hydrogen, and 549 pounds of oxygenated hydrocarbons produced by partial oxidation of about 4 percent of the butene feed in the reactor during this period. Thus, the aqueous condensate recovered from separator 11 totals about 46,389 pounds at the end of this 26 minute period. This stream passes via conduits 16 and 15 to and through (under suitable automatic control) the water drum of steam generator 21 (since no steam is being produced therefrom during this period) via conduit 19 and open valve 20 to surge tank 17 for temporary storage, valve 14 being closed.

When this inventory in tank 17 is established, the feeding of fresh steam via line 3 is terminated by closing valve 23 and the feeding of the desired flow rate of steam, produced from the recycle water in boiler 21 via line 24, is initiated by opening valve 22. At this time, the concentration of water-soluble organics in the tank 17 aqueous condensate is about 1.2 weight percent. Thereby, the steam-water operation is on a recycle basis through the "aqueous circuit" of the process with the surge 17 "floating on the line" to insure water suply to boiler 21 as well as to accept additional water and condensible, water-soluble organics produced in reactor 4.

During the next 64 minutes of the dehydrogenation period, an additional 3545 pounds of water and 1352 pounds of water soluble organics are produced in the reactor and are added to the inventory in surge 17 so that at the end of this reaction period a total inventory of 51,286 pounds of aqueous condensate has been collected in tank 17. In all, 1901 pounds of water soluble, condensible oxygenated hydrocarbons have been produced in the dehydrogenation period and this amount is retained in the aqueous condensate as a concentration of about 3.7 weight percent therein.

Since the discharge of this quantity of organic acids and/or aldehydes as waste water or into the atmosphere as water vapor every two hours would be undesirable, the value of this invention will be readily evident to those skilled in the art of pollution elimination. This quantity of water-soluble organics is disposed of by complete oxidation to carbon oxides and water during the regeneration period by feeding this contaminated water via line 18 and open valve 14 (feed water pump not shown) to boiler 21 for conversion to steam to be used during catalyst regeneration.

Following termination of the dehydrogenation cycle, hydrocarbon introduction to the reactor is discontinued. The reactor is maintained at a temperature of 1050° F. for a period of 30 minutes during which time the air and steam feed rates to the reactor are maintained at substantially the same levels employed during the dehydrogenation cycle. As a result, recycle condensate is converted to steam in boiler 21 at a rate of 102,500 pounds per hour with the result that the substantially total inventory of contaminated process water is consumed during the regeneration cycle. During this time, the oxygenated hydrocarbons present in the recycle process water are completely oxidized. As a result, reactor effluent can be vented to the atmosphere by way of pipes 5, 6 and valve 7, if desired, valve 8 being closed. However, in many situations, it is preferable to conserve even this regeneration steam for use in the next dehydrogenation cycle, in which instance it can be recycled as previously described. It may be necessary at intervals to exhaust a certain amount of the reactor effluent steam during the regeneration cycle due to the amount of water produced during each dehydrogenation cycle. The extent of this excess accumulation will, of course, depend upon the amount of loss inclurred during the process; the greatest part of which is generally attributable to the loss of water vapor from separator 11 along with the hydrocarbon phase by way of pipe 13. It is, indeed, possible and at times may be desirable to control the temperatures and pressures in the separator 11 so that the amount of water removed along with the hydrocarbon by way of pipe 13 is substantially equivalent to the excess water produced during the dehydrogenation cycle. By this procedure, the expense of cooling condenser 10 and steam production would be reduced.

During the dehydrogenation cycle, approximately 4 percent of the butene feed is oxidized to organic acids, aldehydes, etc., based on hydrocarbon feed. As a result of the recycle procedure, herein described, the concentration of these contaminants in the condensate reaches a level of about 1.2 weight percent at the termination of the first 26 minute dehydrogenation cycle.

At this time, the condensate is fed to steam generation means at a rate of 102,500 pounds per hour and this steam replaces that from the outside source, is mixed with air, superheated to 1050° F. and fed to the reactor as before. This recycle operation is practiced for the remaining 64 minutes of the process period during which about 3545 pounds of water, generated by oxidation of reaction hydrogen, are added to the process inventory for a total of 51,286 pounds. During this latter period, the concentration of contaminants in this condensate rises to about 3.7 weight percent since their generation and recovery continues while the water inventory increases only slightly. Since the nitrogen-butadiene-butene stream upon being phase-separated from the condensate will remove water by virtue of saturation of the vapor stream, somewhat less water than the above may be recovered depending upon the temperature and pressure of the vessel in which the separation is performed.

The catalyst in the reactor is regenerated at this point by stopping the butene feed but continuing the steam-air feed at the previous rates and at 1050° F. for a 30-minute period, thus utilizing about 51,250 pounds of condensate. This procedure not only regenerates the catalyst but disposes of substantially all of the condensate inventory containing the oxygenated contaminants by oxidation to carbon oxides and water followed by venting of the reactor effluent from which process heat may be recovered, if desired.

Although, the presently preferred embodiment of this invention has been described with regard to the dehydrogenation of olefins and hydrocarbons in the presence of tin phosphate catalysts as disclosed in U.S. Pat. No. 3,320,329, it can be applied equally well and with similar results to dehydrogenation processes employing iron oxide catalysts or oxidative dehydrogenation processes employing conventional catalysts, such as iron oxide, etc. Substantial amounts of oxidized hydrocarbons, e.g., acetaldehyde, etc., are produced in all oxidative dehydrogenation processes. The amount of these contaminants produced in non-oxidative dehydrogenation systems is usually considerably less. However, in all instances, it is desirable to eliminate these contaminants from process effluents in order to prevent pollution problems, similarly, it is desirable to minimize process requirements for make-up steam, water, etc., which are accomplished by the accumulation and recycle of dehydrogenation effluent. In these instances, the concentration of oxidized impurities in the steam recycle will continue to increase if not removed by some means. It can be seen, therefore, that the process of this invention is advantageous not only as regards efficiency of process operation but also serves a broader purpose of minimizing the degree of air and water pollution by industrial sources.

I claim:
1. In the dehydrogenation of hydrocarbons in the presence of steam, and a dehydrogenation catalyst wherein oxygenated hydrocarbons are produced, the improvement comprising (1) condensing said oxygenated hydrocarbons along with said steam in the reactor effluent, (2) separating the thus condensed steam and oxygenated hydrocarbons from the hydrocarbon portion of the effluent, (3) recycling said oxygenated hydrocarbons and condensed steam after vaporization to the reaction zone during dehydrogenation whereby there is an accumulation of oxygenated hydrocarbons in the condensed steam and (4) recycling said condensed steam containing accumulated oxygenated hydrocarbons after vaporization and air to the reaction zone during regeneration of the dehydrogenation catalyst whereby, in the absence of fresh hydrocarbon feed, said oxygenated hydrocarbons are converted to carbon oxides and water thereby removing the necessity of purging said accumulated oxygenated hydrocarbons from the system as environmental pollutants.

2. The method of claim 1 wherein said dehydrogenation is conducted in the presence of a dehydrogenation catalyst and oxygen, thereby being oxidative dehydrogenation, a portion of said oxygenated hydrocarbons are recycled to said reaction zone during said dehydrogenation, and the remainder of said oxygenated hydrocarbons being accumulated during said dehydrogenation cycle, and at least a portion of the thus accumulated oxygenated hydrocarbon being recycled to said dehydrogenation zone during regeneration of said catalyst.

3. The process of claim 2 wherein said condensed steam and oxygenated hydrocarbons are heated to regenerate said steam before recycle to said reactor.

4. The process of claim 3 wherein said condensed steam and oxygenated hydrocarbons are accumulated during the initial period of said dehydrogenation cycle during which period process steam containing essentially no oxygenated hydrocarbon is fed to said reactor until such time that sufficient condensate has accumulated as inventory in said process to satisfy recycle and regeneration requirements when taken in combination with water produced by said dehydrogenation reaction.

5. The method of claim 2 wherein said hydrocarbons are aliphatic hydrocarbons having from about 4 to 7 contiguous carbon atoms, said catalyst comprises tin phosphate and said oxygenated hydrocarbons have up to about 7 carbon atoms.

6. The process of claim 2 wherein the total process water inventory is not substantially greater than the regeneration steam required during said regeneration cycle.

7. The method of claim 5 wherein said oxidative dehydrogenation is conducted at a temperature within the range of from about 800 to about 1200° F. and wherein said regeneration of said catalyst is conducted at a temperature within the range of from about 850 to about 1100° F.

References Cited
UNITED STATES PATENTS

| | | | |
|---|---|---|---|
| 2,436,600 | 2/1948 | Reeves | 260—680 |
| 3,243,472 | 3/1966 | Dinwiddie | 260—680 |
| 3,336,414 | 8/1967 | Woerner | 260—681.5 |
| 3,426,094 | 2/1969 | Karkalits | 260—680 |

PAUL M. COUGHLAN, Jr., Primary Examiner

U.S. Cl. X.R.

23—2; 252—416